United States Patent
Philipps

[15] 3,690,703
[45] Sept. 12, 1972

[54] COUPLING FOR HOSES OF DIFFERENT DIAMETERS
[72] Inventor: Virgil Philipps, Chicago, Ill.
[73] Assignee: Federal Auto Products Co., Inc., Chicago, Ill.
[22] Filed: Dec. 2, 1970
[21] Appl. No.: 94,502

[52] U.S. Cl. .................. 285/177, 285/256, 285/398
[51] Int. Cl. ............................................. F16l 33/20
[58] Field of Search....... 285/177, 398, 371, 256, 382

[56] References Cited
UNITED STATES PATENTS

| | | |
|---|---|---|
| 3,433,505 | 3/1969 | Weatherhead ............. 285/398 |
| 2,768,844 | 10/1956 | Schadeberg ............... 285/177 |
| 2,937,891 | 5/1960 | Gressel ..................... 285/177 |
| 3,529,855 | 9/1970 | Bragg ....................... 285/398 X |
| 2,300,517 | 11/1942 | Milton ...................... 285/256 X |

FOREIGN PATENTS OR APPLICATIONS

| | | |
|---|---|---|
| 258,251 | 4/1928 | Italy ......................... 285/177 |
| 22,827 | 10/1897 | Great Britain ............ 285/398 |

Primary Examiner—Thomas F. Callaghan
Attorney—Edward C. Threedy

[57] ABSTRACT

A coupling for hoses of different diameters in which the ends of the hoses abutting a sealing washer disposed between the ends of the hoses with the washer mounted upon an insert tube of two integral lengths of different diameters to provide a shoulder intermediate the ends of the insert tube to hold a metallic washer upon the insert tube between the adjacent ends of the hose lengths to effect a tight seal, and with a one-piece sleeve surrounding the end portions of the hoses and circumferentially crimped to provide a firm connection between the two end portions of the hoses.

1 Claim, 3 Drawing Figures

Patented Sept. 12, 1972

3,690,703

INVENTOR.
VIRGIL PHILIPPS.
HIS ATTORNEY

COUPLING FOR HOSES OF DIFFERENT DIAMETERS

SUMMARY OF THE INVENTION

A principal object of this invention is to provide a hose coupling which will make a strong, leakproof and durable connection between adjacent end portions of two hose lengths, such as is employed, for example, in a power steering system of an automobile. In such system the avoidance of any leakage of the fluid is highly essential. The object of this invention is to provide a coupling which will meet this stringent demand.

The objects of this invention are accomplished by the preferred form of construction shown in the accompanying drawings, and in which.

Figures 1, 2, 3:
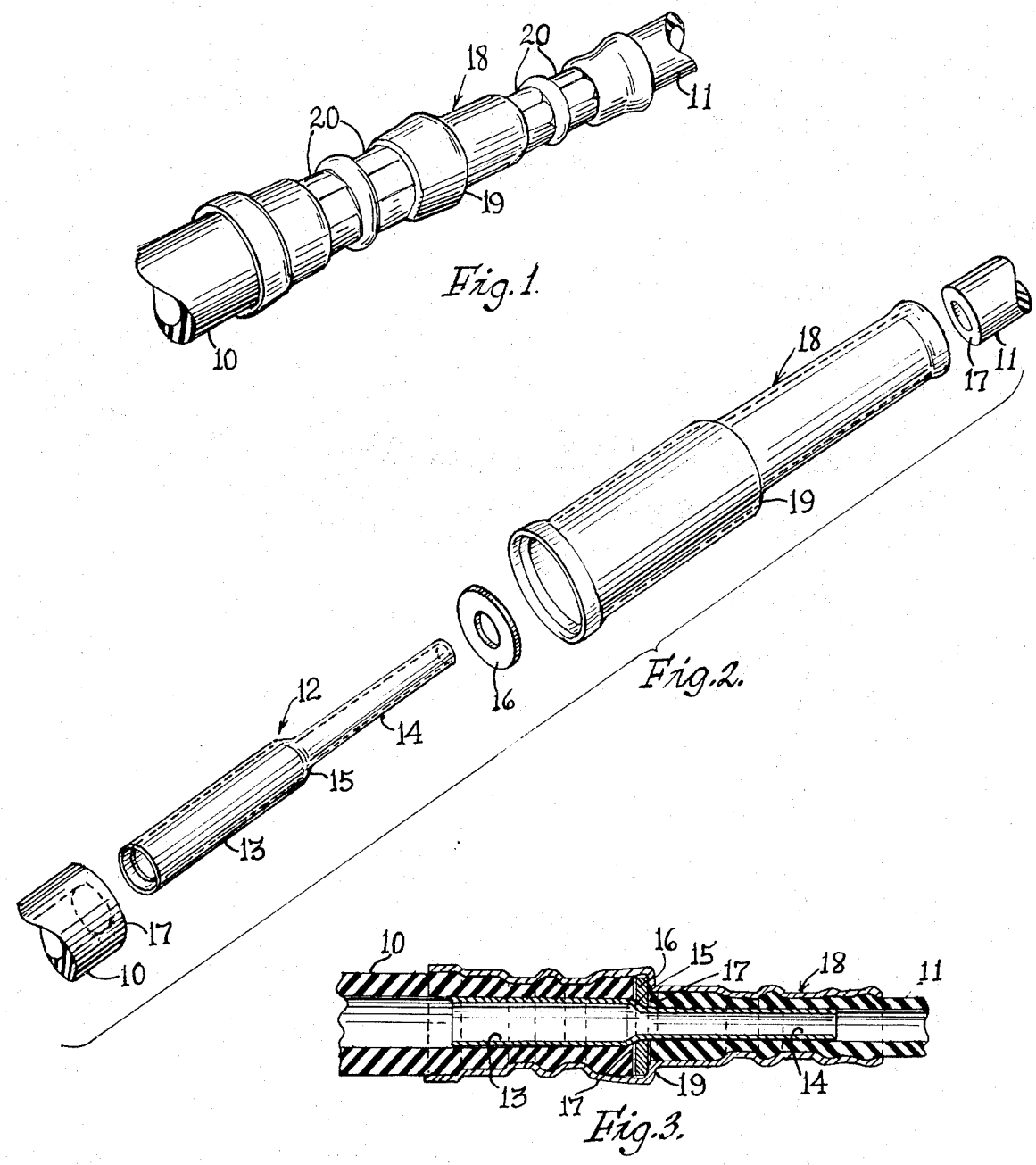
FIG. 1 is a perspective view of the hose coupling embodied in the invention.
FIG. 2 is a perspective view of the components of the hose coupling in exploded relation.
FIG. 3 is a longitudinal sectional detail view of the hose coupling.

The aligned end portions of the hose are indicated at 10 and 11. These hose end portions may be formed of any suitable material such as now presently employed in power steering systems of automobiles.

The end portion 10, as will be seen from the drawings, is of a diameter greater than the diameter of the end portion 11. The hose end portions 10 and 11 are arranged in alignment with respect to each other and have inserted therein an insert tube 12, preferably of a suitable rigid metal which will best serve the purpose.

This insert tube 12 has one end portion 13 of a diameter larger than the diameter of the opposite end portion 14. These end portions 13 and 14 are adapted to be inserted into the hose end portions 10 and 11, respectively, as shown in the drawings.

By forming the insert tube 12 of different diameters there is provided intermediate the ends of the insert tube a circumferential shoulder 15. A metal washer 16 is mounted upon the end portion 14 of the insert tube against the shoulder 15 and between the adjacent end surfaces 17 and the hose end portions 10 and 11.

To complete the invention, a metallic sleeve 18 having portions of different diameters, and providing intermediate the end portions of the sleeve a shoulder 19, embraces the end portions 10 and 11 of the hoses. The washer 16, when mounted upon the insert tube 12, firmly bears against the shoulder 19 of the sleeve. After the sleeve 18 has been properly mounted with the hose end portions 10 and 11 inserted therein (see FIG. 3), it is crimped circumferentially as at 20 to provide a firm and leakproof connection between the hoses.

The metal insert tube has as one of its functions the prevention of the collapse of the hose end portions 10 and 11 upon crimping the sleeve upon such end portions, resulting in not only a leakproof seal between the hose and portions but also an unobstructed passage through the power steering system or the like, a requirement which is highly essential to the proper function of such systems.

The hose coupling as shown and described herein comprises relatively few parts. This enables the same to be assembled in the most economical and efficient manner.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A hose coupling for connecting ends of hoses of different diameters together including
   a. a metal sleeve providing a shoulder intermediate its ends dividing said sleeve into sections of different diameters which receive therein hose ends of different diameters,
   b. an elongated metal tube of a length less than said sleeve divided into end portions of different diameters and insertable within said sleeve with its different diameters corresponding to the different diameters of said sleeve,
   c. said tube at its junction between its different diameters providing a shoulder equidistant the ends thereof adapted to be placed in spaced relation to said shoulder of said sleeve when said tube is inserted therein, and
   d. a circular metal washer having an outer diameter slightly less than the inner surface of the larger diameter end section of said sleeve said washer having an inner diameter slightly and greater than the outer surface of smaller diameter end portion of said tube and mounted on said tube and interposed between and in abutting engagement with said shoulder of said sleeve and said tube so as to space said tube from said sleeve when said tube is inserted in said sleeve,
   e. said washer adapted to abut the opposite ends of the hose end portions when the latter are inserted into the coupling and completely surround said tube within said sleeve, so as to restrict longitudinal movement therebetween and said sleeve adapted to be circumferentially crimped on the end portions of the hoses.

* * * * *